United States Patent [19]
Curlett et al.

[11] Patent Number: 5,556,489
[45] Date of Patent: Sep. 17, 1996

[54] WHEEL-MOUNTED TIRE INFLATOR

[75] Inventors: John Curlett, Watsonville; Glen J. Brown, Santa Cruz, both of Calif.

[73] Assignee: Pacific Aeromotive Corporation, Santa Cruz, Calif.

[21] Appl. No.: 291,159

[22] Filed: Aug. 16, 1994

Related U.S. Application Data

[63] Continuation-in-part of Ser. No. 181,043, Jan. 14, 1994, abandoned.

[51] Int. Cl.⁶ .......................... B60C 23/12; F04B 31/00; F04B 19/22
[52] U.S. Cl. .......................... 152/418; 417/233; 417/211
[58] Field of Search .................. 152/415, 418, 152/419; 417/211, 231, 233

[56] References Cited

U.S. PATENT DOCUMENTS

| | | | |
|---|---|---|---|
| 1,179,549 | 4/1916 | Molkenbur | 152/418 |
| 1,254,903 | 1/1918 | Hall | 152/418 |
| 1,285,808 | 11/1918 | Schroeder | 152/418 |
| 1,566,667 | 12/1925 | Fuller | 152/418 |
| 1,830,249 | 11/1931 | Spicer | 152/418 |
| 1,874,375 | 8/1932 | Spicer | 417/211 |
| 1,930,041 | 10/1933 | Crowley et al. | 152/418 |
| 2,055,983 | 9/1936 | Peo | 152/418 |
| 2,161,384 | 6/1939 | Rinfret | 152/418 |
| 2,723,700 | 11/1955 | Caldwell | 152/418 |
| 4,349,064 | 9/1982 | Booth | 152/418 |
| 4,570,691 | 2/1986 | Martus | 152/418 X |
| 5,051,073 | 9/1991 | Newbold | 417/526 |
| 5,201,968 | 4/1993 | Renier | 152/418 |
| 5,355,924 | 10/1994 | Olney | 152/418 |

FOREIGN PATENT DOCUMENTS

| | | |
|---|---|---|
| 126207 | 1/1932 | Austria . |
| 637361 | 10/1936 | Germany . |
| 2813601 | 10/1979 | Germany . |
| 69388 | 6/1945 | Norway . |
| 429262 | 6/1935 | United Kingdom . |

*Primary Examiner*—Michael W. Ball
*Assistant Examiner*—Francis J. Lorin
*Attorney, Agent, or Firm*—Frank C. Price

[57] ABSTRACT

This invention pertains to the maintenance of pressure within a vehicle wheel tire to a pre-set level with the air supply being produced by a pump which is driven by centrifugal force, i.e., the wheel rotation creates a centrifugal force which activates a weight to move a piston which pumps the tire inlet air. The pump can be mounted outside or inside the tire volume. Another pump uses the impetus from bumps encountered by the wheel to drive the pump.

4 Claims, 8 Drawing Sheets

WHEEL-MOUNTED TIRE INFLATOR

This is a Continuation-in Part for application Ser. No. 08/181,043 filed Jan. 14, 1994, now abandoned.

BRIEF SUMMARY OF THE INVENTION

This is the invention of a tire inflator mounted to a vehicle's wheel and powered by the wheel's motion during normal vehicle operation. The objective is to maintain correct tire inflation pressure. The inflator is a positive displacement, piston-type compressor wherein the piston responds to the centrifugal force generated by the wheel's rotation or to the vertical acceleration generated by the wheel's response to bumps in the road. The piston is of a small diameter, but includes an upper extension made of dense material. Thus, there is sufficient mass responding to rotation or the motion from bumps to press the piston and create the necessary pressure for inflation. The piston is returned by a spring once the forces acting upon the piston decline due to slow vehicle speed, a smooth surface or both.

Inlet and outlet check valves are included. The inflator can be mounted to the wheel either within the tire or external to the tire. If the centrifugal forces of rotation are to propel the piston, the axis of the cylinder is oriented radially. If the pump is designed to be energized by the wheel's reaction to bumps in the road, it can be oriented tangential to a circle centered at the wheel axis. It could have a double acting piston. Compression would then take place when the compressor would be approximately at 3:00 o'clock or 9:00 o'clock in its rotation with the wheel as a bump would be hit by the wheel.

For the case of centrifugal force for piston action, there would be one compression stroke for each excursion of automobile speed from stationary or some minimum speed up to the automobile speed which translates into adequate rotational speed to generate the needed piston force to create air flow into the tire. For the case in which bumps in the road actuate the piston, the compression strokes would be more random than the bumps themselves since the strokes would only occur when the axis of the compressor would be aligned in its rotation to a direction more or less parallel with the wheel motion caused by the bump.

Pressure regulation can be provided by designing the inflator's compression ratio to limit the delivery pressure to that desired to be the maximum tire inflation pressure. Compression ratio is the ratio of cylinder volume at the start of a piston stroke to the volume remaining in the cylinder at the end of the piston's stroke. Compression ratio for a given basic design is easily set at the time of manufacture by either limiting the piston travel or by providing additional "dead" volume within the piston. One method for this is to drill a hole in the bottom of the piston at the time of manufacture, the depth of the hole being set to obtain the desired pressure development.

When the inflator is designed to be actuated by centrifugal force, it works with the piston gradually progressing along the cylinder against the compressed charge of air in the cylinder as the vehicle accelerates and the wheel rotation rate increases. Once the charge of air exceeds the existing tire pressure plus the discharge valve cracking differential pressure, any increased vehicle speed causes additional stroke movement of the piston and discharge of the compressed air into the tire. As the vehicle slows or stops, then the piston return spring will have returned the piston to the point of the beginning of its stroke and the process can begin again with new vehicle motion. With a typical passenger car operation which includes many stops and starts, the inflator delivers a small charge of air each time the vehicle accelerates from a speed low enough to allow the spring to return the piston to a speed high enough to force the piston to compress air and discharge compressed air into the tire.

In order to maximize the force available for driving the piston to compress the air in the cylinder, the piston preferably has an enlarged end made of dense material. The enlarged end is opposite the end of the piston that fits into the cylinder, with its diameter being large compared to the piston diameter. The enlarged end is made preferably of brass, lead or other high density material.

The tire pump is not only an automatic convenience for maintaining tire inflation, its installation eliminates the needless extra tire wear and fuel consumption caused by underinflated tires. Where only a small leak is involved, it precludes the inconvenience and danger of a flat tire.

The following clarifies terminology: the term "bottom" of the piston stroke is used to mean the at-rest piston position with atmospheric pressure in the cylinder while the term "top" of the piston stroke is used to mean the piston in the position fully displaced by centrifugal force with high pressure in the cylinder. Also, the words "inflator," "pump," and "compressor" are interchangeable. The term "o-ring" is understood to mean an elastomeric ring of any desired cross section.

There is flexibility in the concept for choosing what speed/centrifugal force will deliver the required tire pressure. The piston diameter and piston weight directly determine the speed/pressure relationship for the pump. Those, combined with the displacement and compression ratio, determine the performance of the pump. Any number of combinations might be used depending upon the desired pressure, the size of the tire and the typical drive cycle to be expected for a given application.

The invention includes a pressure relief valve which regulates tire pressure as an alternative to having it set by the limit imposed by the compression ratio of the pump. In the preferred embodiment the pump is mounted to the wheel rim inside the tire volume by a circumferential strap. However, an external mounting of the pump is also disclosed.

The use of a relief valve for pressure regulation in the present invention allows the pump to be designed with high compression ratio which maximizes air delivery at all tire pressures below the desired inflation pressure. The relief valve is located within the body of the compressor piston. An adjustable spring holding the relief valve poppet closed determines the maximum pressure produced by the pump.

In addition to pumping by centrifugal action for the unit mounted with the cylinder axis oriented radially, additional pumping occurs when a road bump is encountered by the wheel with the pump assembly near the 6- or 12-o'clock position of wheel rotation. This will most commonly occur after the vehicle has reached a moderate speed and the pump has delivered air to the tire by centrifugal action when acceleration due to a bump causes the piston to "reset," and then deliver air again by centrifugal action.

The discharge check valve is made up of a tapered circumferential groove in the pump body containing an elastomeric o-ring which encloses an annular volume communicating to a port located at one point on the circumference of the groove under the o- ring. The port leads out from the pump cylinder, under the o-ring and to the tire volume. The o-ring fits tightly down in the tapered groove sealing against a back flow of compressed air; yet, it readily lifts to allow the passage of compressed air into the tire volume. The principle of the o-ring operation can operate using rectangular, oval or triangular, as well as circular cross sections for the ring. To preclude confining the cross section to circular the seal might be referred to as a seal ring rather than an o-ring. This design is particularly useful for the tire inflator because it readily has both zero leakage and a low cracking pressure differential. Furthermore, it adds very little or no extra length to the pump body.

Any conventional check valve consists of an active or moveable seating member and a more or less fixed seat and some means of returning the active member to the seat after passing a fluid in the desired direction. This means may be gravity or a spring source or some moving frictional force. In the case of the subject discharge check valve the "o" ring plays both the parts of the active seating member and of the restoring spring force. The seat for this active member is made up of the tapered walls of the circumferential groove on the outside of the compressor cylinder body.

The action of the check valve is: in an undisturbed state the o-ring lays snugly seated against the tapered walls of the groove; if the external pressure is increased, the o-ring is forced into higher sealing contact pressure against the tapered walls. Thus, no air can pass. As the internal pressure under the o-ring is raised by the piston pumping action, the o-ring will be lifted from its seated position as the internal pressure becomes enough higher than the external pressure to overcome the seating effect of the elastic tension of the o-ring. The air pressure acts on an annular area made up of the width between the contact surfaces of the o-ring and the circumferential length of that width. This check valve could be applied to liquid as well as gaseous fluids.

Preferably this pump has a high compression ratio to make the pump highly effective. Preferably, when the pump is installed within the tire, the pump is small enough to fit inside the tire without interfering with the tire's usual mounting and operation. Yet, this small pump must deliver an adequate proportion of its displaced volume to the tire, even when the tire is only slightly underinflated. Any volume remaining in the cylinder at the end of the piston compression stroke contains compressed air that will not be discharged into the tire. If, for example, the tire is slightly under-inflated at 30 psi and the compressor has a compression ratio of 5.1, which allows the pump to achieve a maximum cylinder pressure of 60 psi (neglecting temperature changes during compression), then at maximum pressure fully half of the air in the cylinder will remain in the cylinder and not be discharged into the tire. If, instead, the pump has a compression ration of 9.2, which allows a maximum pressure of 120 psi, then at maximum pressure 75% of the air in the cylinder will be discharged into the tire.

The compression ratio for our invention is readily maximized. For a given displacement this is accomplished by minimizing the volume remaining in the cylinder with the piston at its full compression stroke. Any design with the return spring in the cylinder will have too much remaining volume to be effective. Any design with bellows or a rolling bladder will have excessive remaining volume and will be ineffective in a practical-sized pump.

The present invention includes many improvements over the prior art. These include: (1) A pump housing is included that facilitates mounting, protects the pump from both contamination and physical damage, and allows versions mounted either internally or externally to the tire; (2) A discharge check valve is described that is inexpensive to manufacture as part of the pump body, readily has both zero leakage and low cracking pressure, and can be expected to have a long, reliable service life; (3) A piston seal that is inexpensive to manufacture, yet readily serves the dual functions of sealing the piston on the compression stroke and creating an inlet passage on the return stroke; and (4) An arrangement of design elements that minimizes the volume remaining at the completion of the compression stroke, thus causing a high proportion of the air compressed by the pump to be delivered into the tire. These and other elements of the present invention describe a unique pump that is both economical to manufacture and effective in delivering the air volume needed to overcome tire seepage and maintain optimum tire inflation, actuated by normal driving activity.

DETAILED DESCRIPTION

Figure 1:
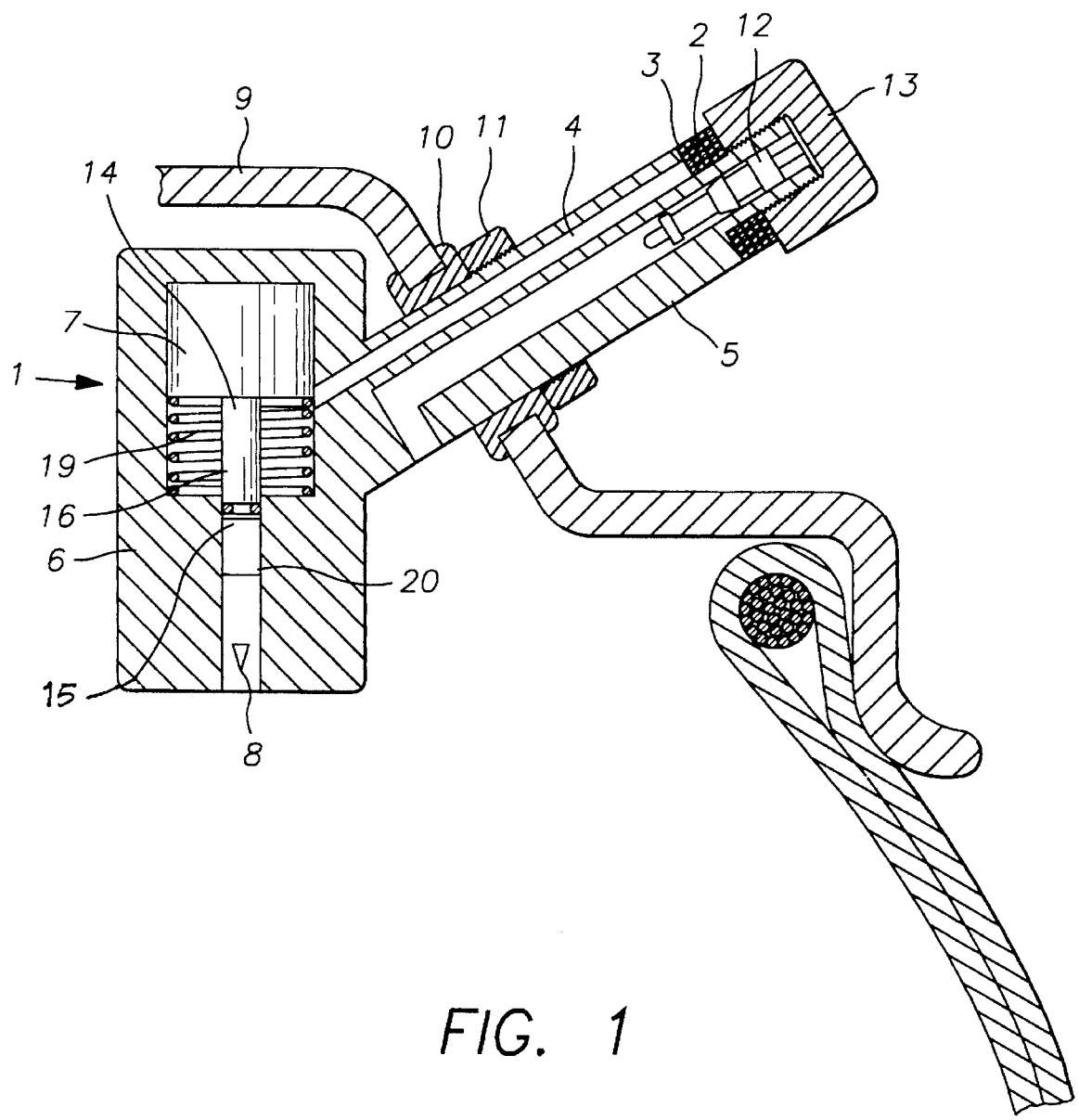
FIG. 1 is a cross sectional view of a single stroke version of the pump mounted with radial alignment inside the wheel rim.

In FIG. 1 is seen the tire pump 1 mounted inside the wheel rim 9 through an elastomeric grommet 10 and held in place by nut 11. The valve stem 5 contains both an air inlet 3 for the passageway 4 to the compressor with a filter 2 and a standard tire fill valve 12 covered by a cap 13. The compressor body 6 contains the cylinder 15, the piston 14, the piston return spring 19, the weight 7 and the discharge check valve 8 which is shown diagrammatically. The piston 14 includes a seal 16 between the piston 14 and the cylinder wall 20.

Figure 2:
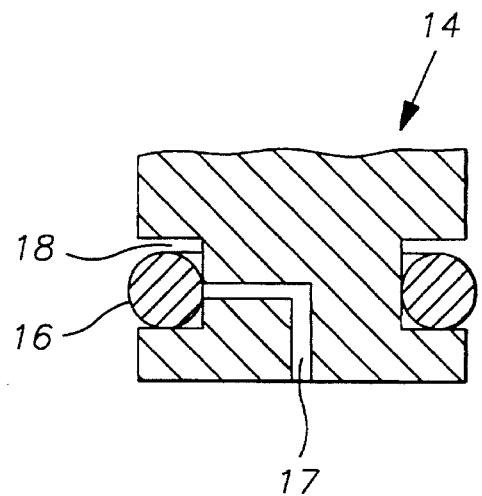
FIG. 2 is an enlarged cross-sectional view showing the detail of the end of the compressor piston, the inlet check valve.

The detail of the end of the piston 14 in FIG. 2 illustrates how the "O" ring groove 18 is wide enough compared to the width of the "O" ring 16 to allow the "O" ring 16 to move across the groove 18, back and forth, as the piston 14 strokes back and forth thus allowing a charge of air to pass through passageway 17 to the cylinder 15 on each piston 14 intake stroke.

The pump of FIG. 1 is to be installed along with the standard air valve. This would especially apply to adaptations to existing wheel rims. Where the concept is applied to future new cars, some more convenient place of installation could be used which might be separate from the regular tire valve.

Figure 3:
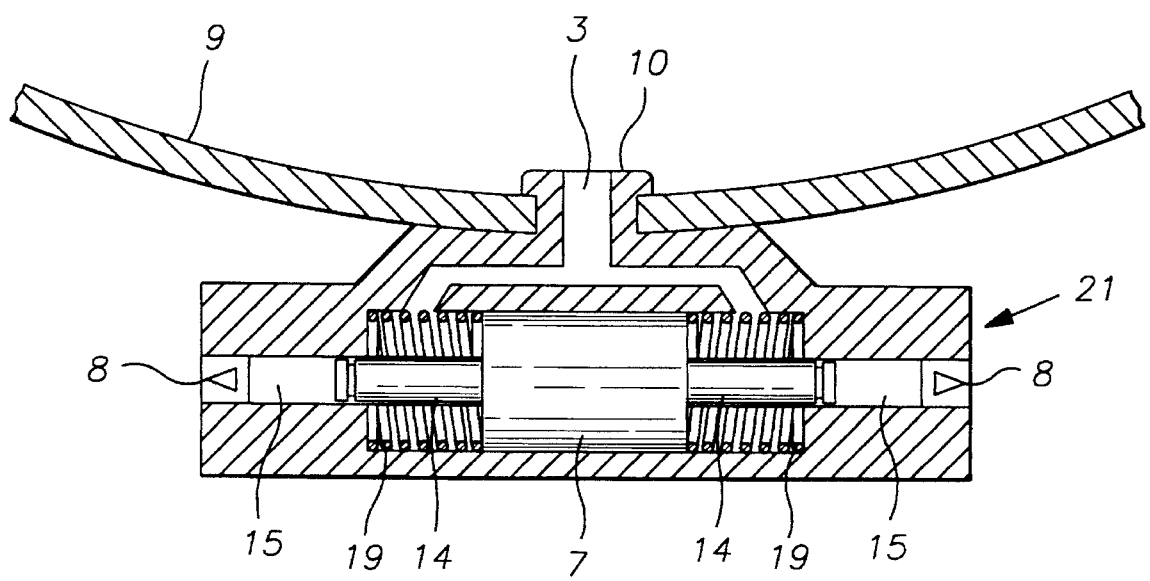
FIG. 3 is a cross sectional view of a double stroke version of the pump mounted with tangential alignment inside the wheel rim.

The pump 21 of FIG. 3 will react only to wheel motion created by bumps in the road. Although a single acting piston will work, in this case a double acting piston is presented which doubles the chances for the pump to be in proper alignment to operate when a bump is hit—at positions in the rotation of approximately 3:00 o'clock and 9:00 o'clock. The two pistons 14 operate in the cylinders 15. The pistons 14 are driven as the weight 7 reacts to accelerations caused when the tire hits a bump. The springs 19 move the pistons 14 to center in an intake stroke after a bump has been hit and a compression stroke occurs, i.e., after the forces of the bump are diminished. Discharge check valves 8 lead from the pump into the tire volume. The inlet line 3 is mounted through the wheel rim 9 with a flange 10. The inflation valve, part of every tire, may be a separate stem mounted on the rim or it may be integrated with the inflator inlet as in FIG. 1.

Figure 4:
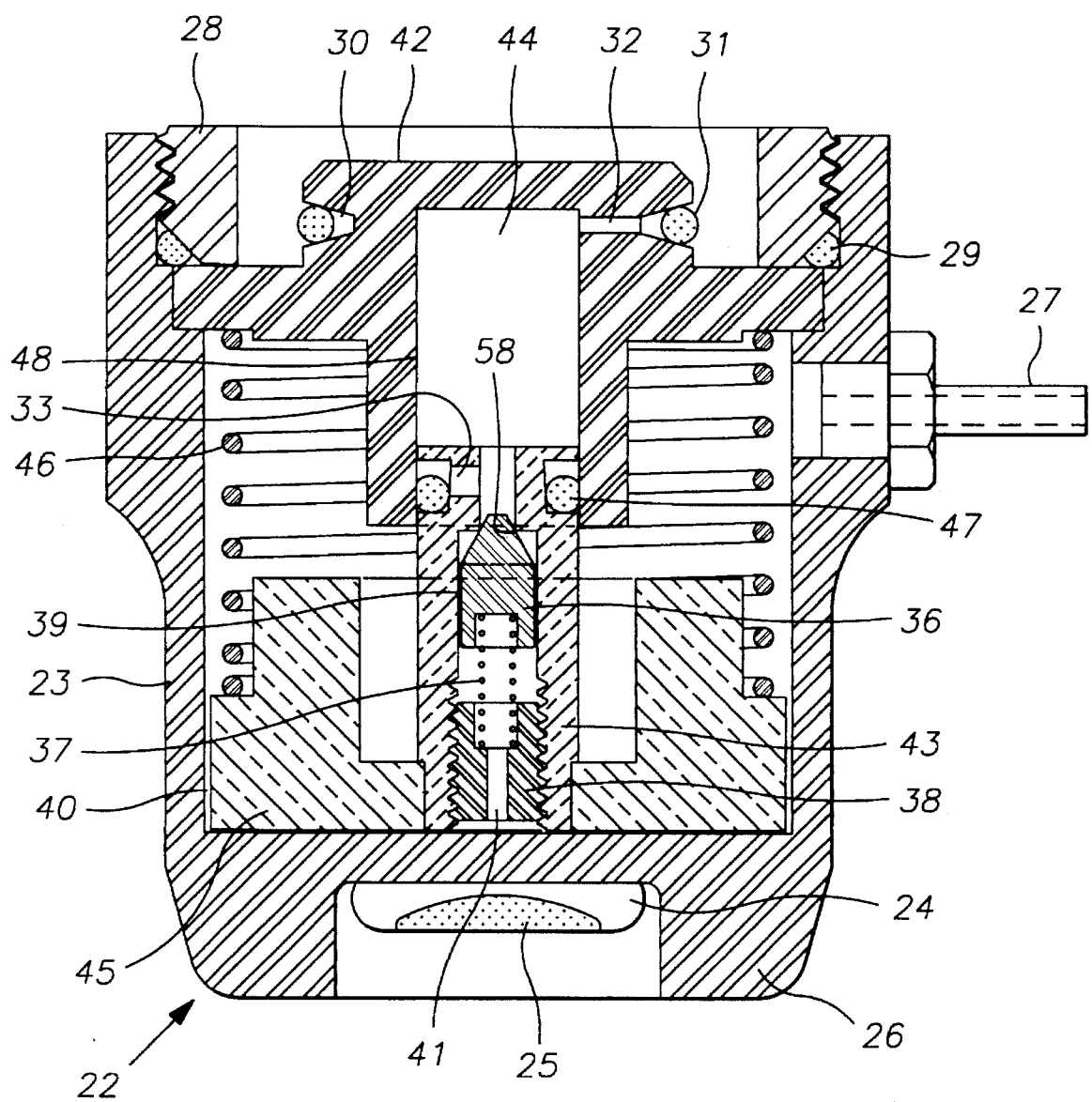
FIG. 4 is a cross sectional view of an embodiment of the invention including an o-ring outlet check valve, a pressure relief valve and a slot for mounting the pump inside the tire to the rim with a strap.

FIG. 4 shows an inflator 22 with its housing 23, and the mounting slot 24 through which a tie strap 25 is contained. The strap circles the wheel rim inside the tire volume to hold the compressor 22 to the wheel. The pump housing 23 has a base 26 which rests on the circumference of the wheel rim, shown in phantom. Not shown is a balancing weight also held by the strap at 180 degrees opposite the pump. Air flows from outside the tire volume through a tube, not shown, connecting through the tire valve stem hole to the pump inlet air fitting 27. The threaded end retainer ring 28, with its o-ring seal 29, holds the internals of the inflator 22 in place. The cylinder block 42 includes the cylinder internal wall 48 and the tapered o-ring groove 30 which holds the pump outlet check valve o-ring 31. Air pressure/flow is connected to the check valve via a passage 32 from the cylinder leading to a position under the o-ring 31. Air flow through passage 32 is prevented in check-valve fashion by the o-ring 31 when the piston 43 is not delivering compressed air or is on its intake stroke. Compressed air delivered from the cylinder 44 lifts the o-ring 31 and flows to the tire volume.

The piston weight 45, under the forces developed by the wheel motion, creates the major force to drive the piston 43 in its compression stroke. The retraction spring 46 actuates the piston weight to create the intake stroke for the piston 43. The cylinder block 42 makes up the cylinder 44, the air passage 32, the discharge check valve system 30, 31 and 32, and, it serves as the base for the spring 46.

Intake air for the pump cylinder 44 flows through port 33 from the cavity 34 during the suction stroke of piston 43 when the o-ring seal 47 is lifted by the piston 43 movement and friction against the cylinder wall 48. On the compression stroke the o-ring 47 is seated as shown sealing air from flowing back into the cavity 34.

Inside the piston 43 is the pressure relief valve poppet 36 with its seating contact at 58. The relieving pressure of the poppet 36 is determined by the properties of the spring 37 and the compression of spring 37 by the adjusting screw 38. The adjustment can only be made when the pump is disassembled. Relieved air proceeds along the clearance between the relief valve poppet 36 and the inner wall 39. The relieved air flows through the port 41 in adjusting screw 38, through the clearance between the piston weight 45 and the interior wall 40, along which the piston weight 45 slides, and on into the air inlet cavity 34.

Figure 5:
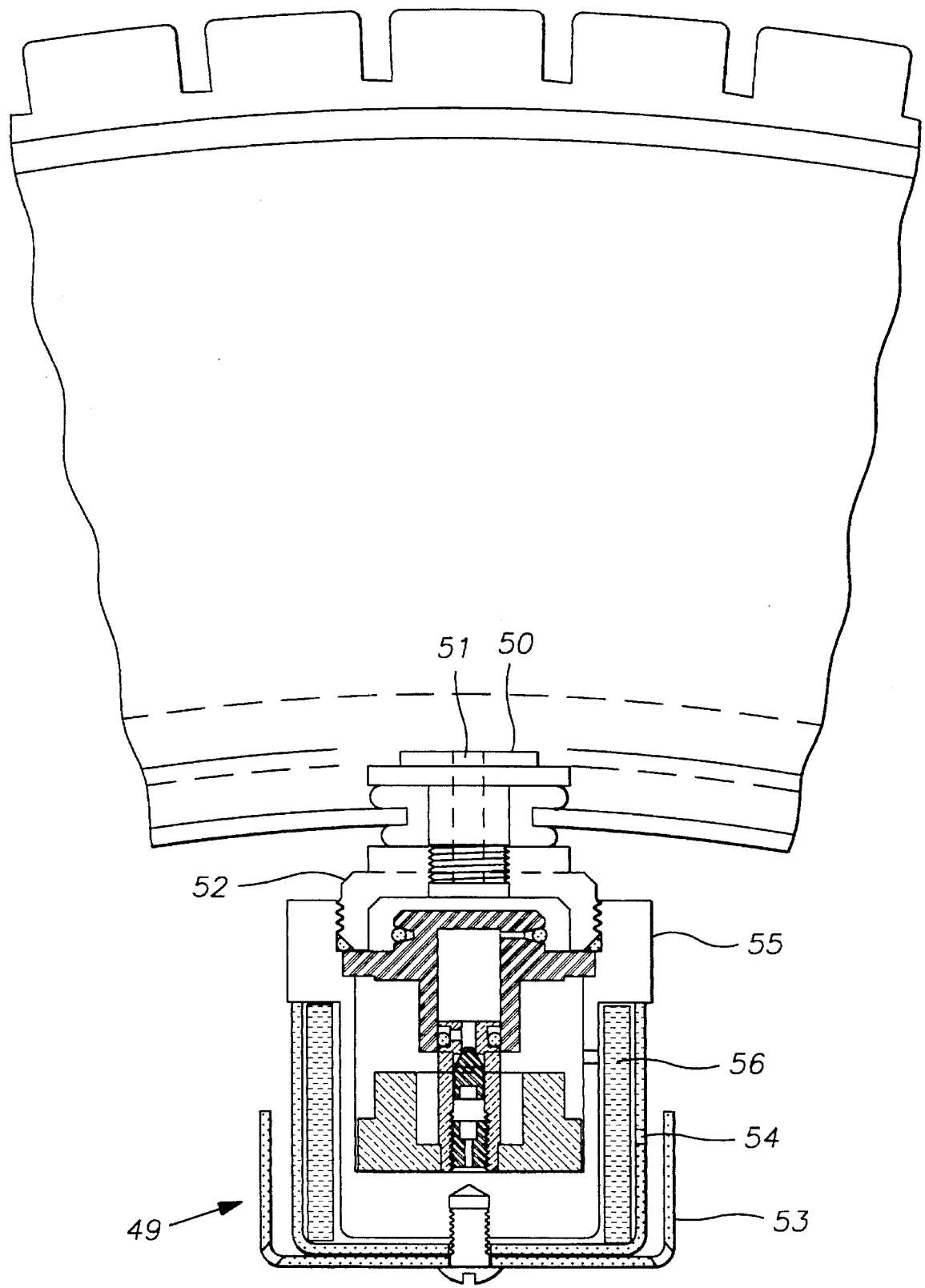
FIG. 5 is a cross sectional view of the pump assembly mounted on the tire rim outside the tire.

FIG. 5 of an inflator 49, with its housing 55 shown mounted outside the tire onto the tire rim, and shows the attachment means, the mounting stud 50 with its high pressure air passage 51. In this case the retainer ring 52 serves as the mounting part for the inflator 49. In this embodiment the dust cover 53 shields the intake air hole 54 and inside the shell is an annular filter element 56 for the intake air.

Figure 6:
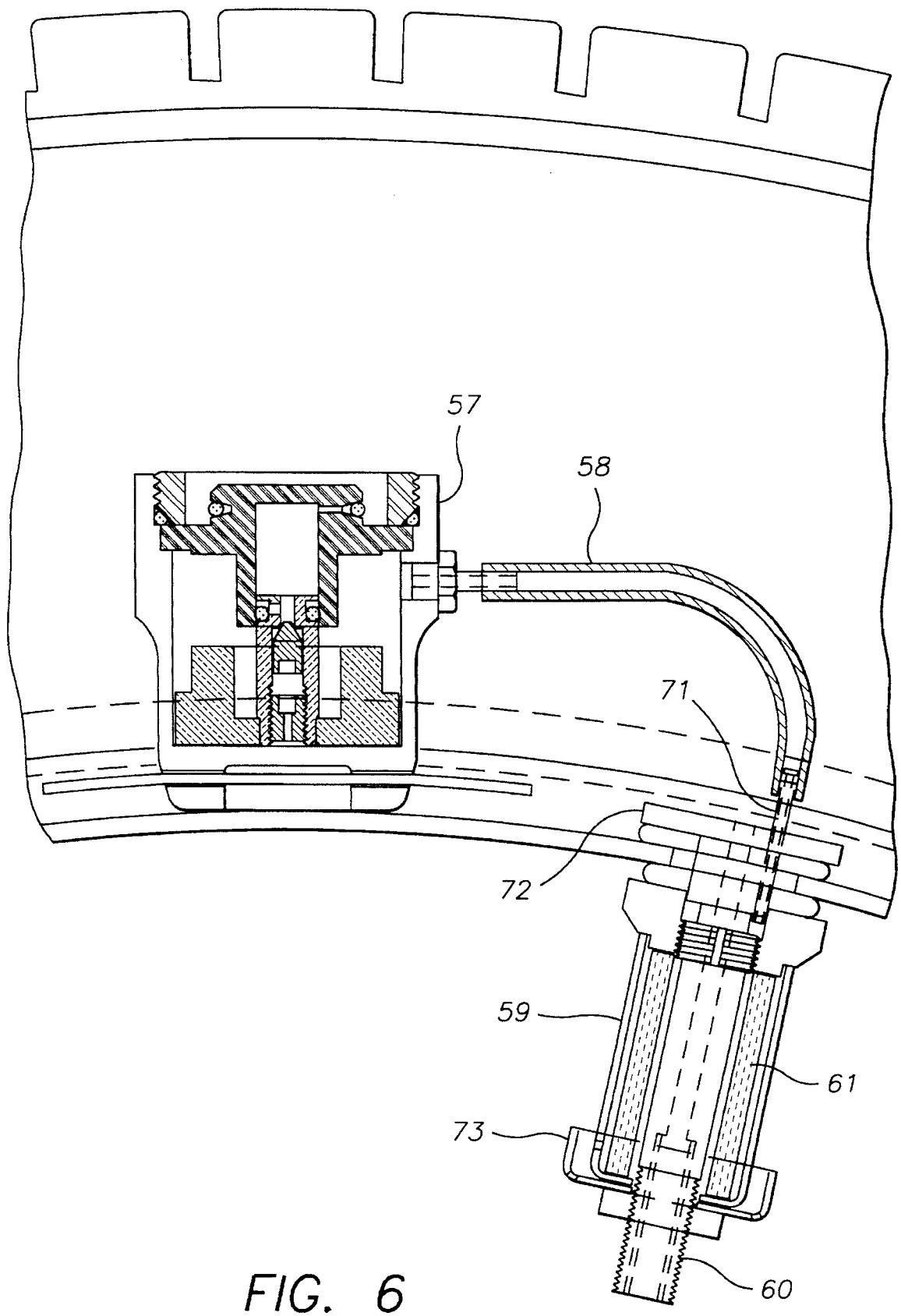
FIG. 6 is a cross sectional view of the inflator mounted inside the tire. The complete system is shown, including the inlet fixture mounted outside the rim and the tube connecting the fixture to the inflator.

In FIG. 6, the pump assembly 57 is shown installed inside the tire rim, attachment strap omitted for clarity of the drawing, with a tube 58 connecting the pump 57 to the inlet air unit 59 which has a standard tire valve 60 and a filter 61. Unit 59 is a modification of a conventional valve stem with a second air passage 71 connecting outside air to the pump 57 inside the tire without the requirement of an additional hole to be drilled through the wheel rim. The modifications to the "screw-in" type valve stem include: a tube 71 of approximately 1.5 mm diameter placed in a hole drilled off-center in the base of the valve stem 72, metal tube 71 for flexible tube 58 attachment, a filter element 61 placed in the air path to tube 71, and a shield arrangement 73 to prevent water and dirt from impacting directly upon the filter.

Figure 7:
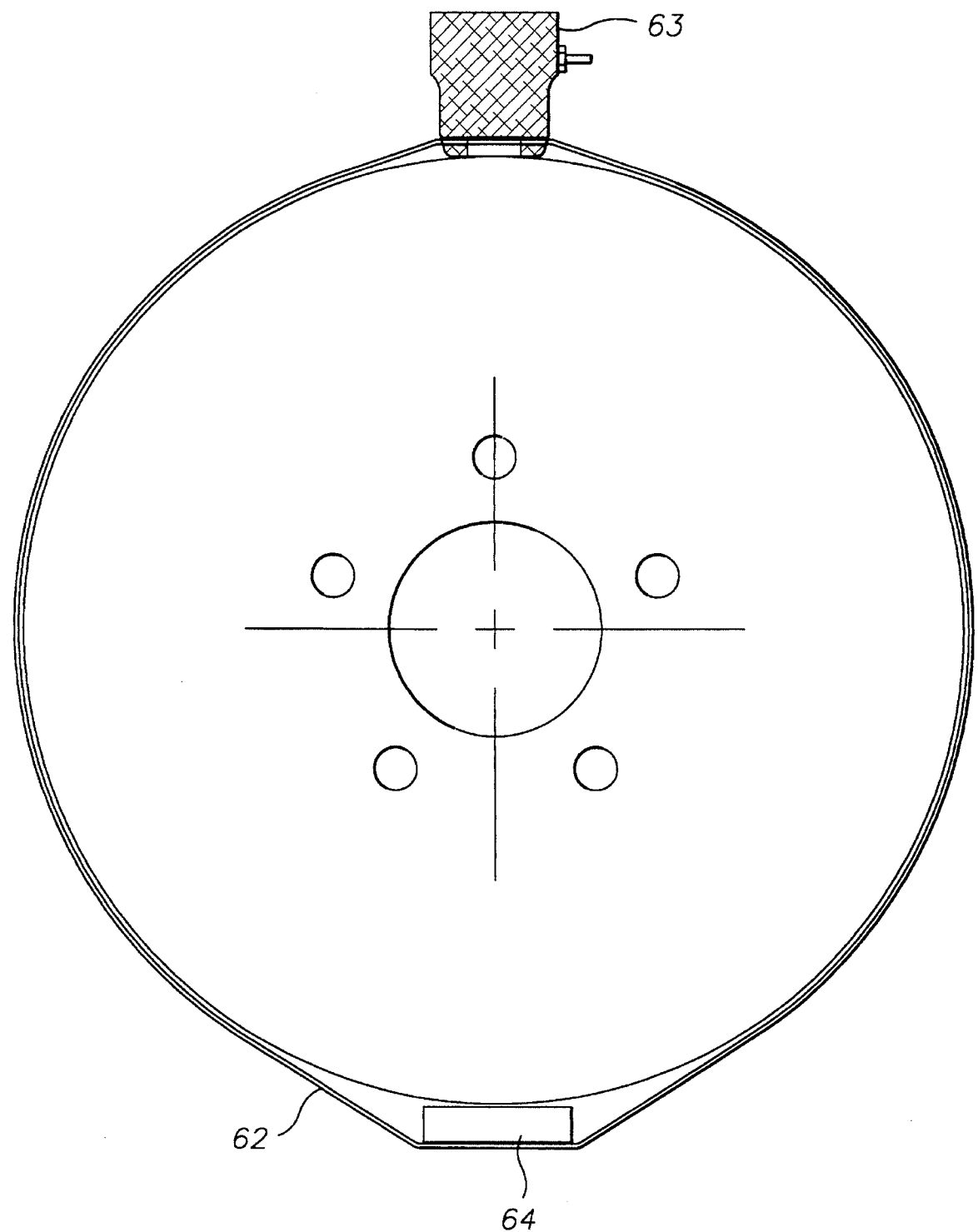
FIG. 7 is a cross sectional view depicting the pump strapped to the tire rim inside the tire volume, including a counter weight for wheel balance.

In FIG. 7 the mounting strap 62 for the internally mounted pump 63 is shown holding the pump 63 and the counterweight 64 to the rim.

Figure 8:
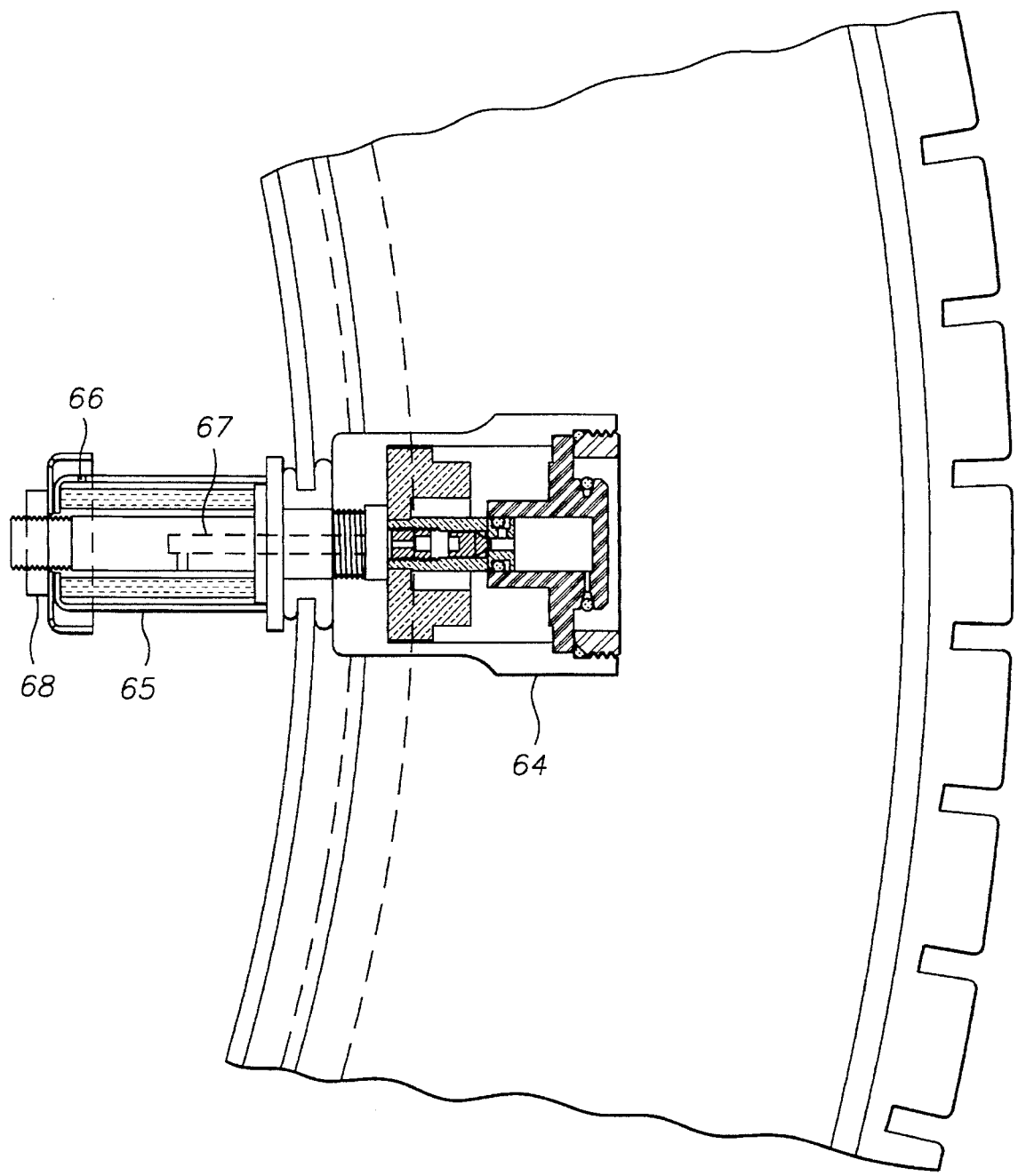
FIG. 8 is a cross sectional view of the inflator mounted inside the tire volume through a hole in the tire rim at the point of air introduction through the inlet fixture.

In FIG. 8 the pump 64 is mounted to the rim at the air inlet point with the filtering outside connection having a housing 65 an air inlet 66, a suction air passage 67 held together by nut 68.

Figure 9:
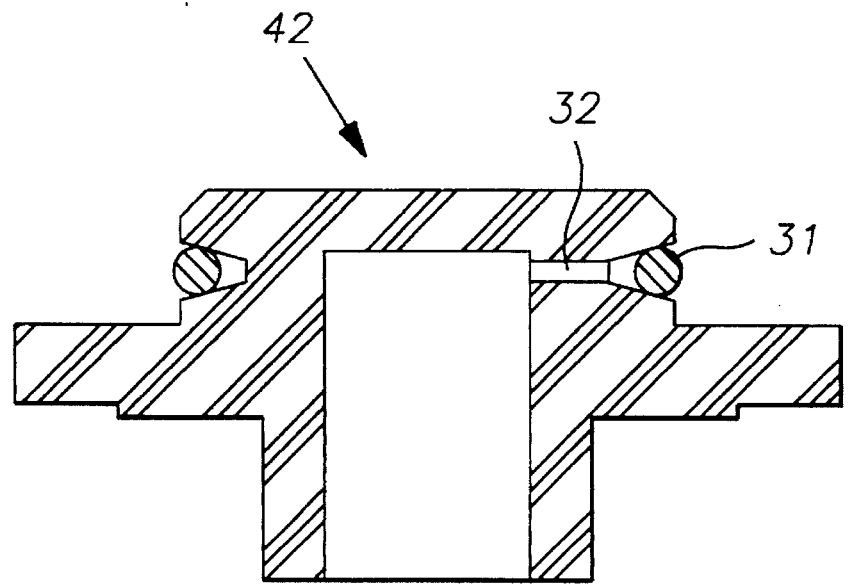
FIG. 9 is a cross sectional view of the pump cylinder including the compressed outlet air o-ring check valve.

In the FIG. 9 the pump cylinder block 42, stands alone with its O-ring 31, the discharge check valve, and the discharge air passage 32.

Figure 10:
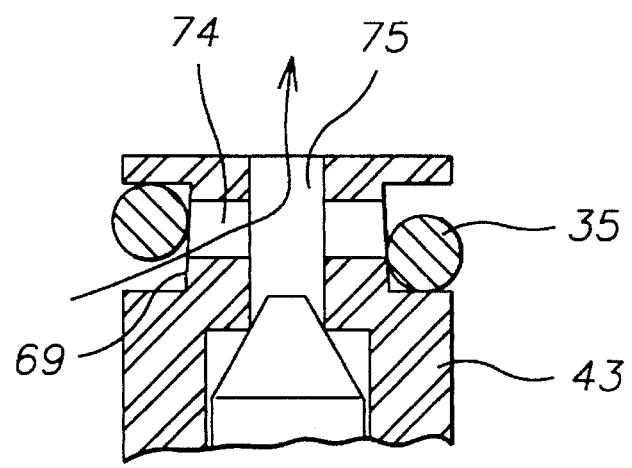
FIG. 10 is a partial cross sectional view of the parts of the inlet check valve on the end of the piston with emphasis on how the o-ring moves to allow intake air and then moves to prevent back flow during the compression stroke.

FIG. 10 shows the sliding o-ring 35 which functions as an inlet check valve for the pump. An arrow shows the air flow to the cylinder. The o-ring 35 acts somewhat like a piston ring for the piston 43. The o-ring moves upward and downward, back and forth, with the piston 43 movement, being forced against the cylinder wall, not shown in this figure. In the left side of the piston 43 the o-ring is shown moved upward by the intake motion of the piston 43. This opens an air passage for filling the expanding cylinder volume. The cylindrical surface 69 is tapered such that the o-ring 35 shrinks from the cylinder wall as it moves upward and this allows ready movement of the o-ring 35 upward. The air flows through the cross hole 74 and the center hole 75. In the right side of the piston 43 the o-ring is shown forced downward by upward piston 43 movement and by pressure such that the o-ring seals between the piston and cylinder wall preventing air from escaping from the cylinder on the compression stroke.

While the externally mounted pump has been shown in FIG. 5 mounted to the rim exterior by a bolt and washer configuration, it might also be mounted by adhesive means. Another means could be with a bracket which fits under the wheel bolts. While only a single pump on a wheel is shown in the drawings, for the case of dual truck wheels, one wheel might have two pumps mounted diametrically opposite each other for balance with each pump feeding compressed air to each of the two tires of the dual wheel.

We claim:

1. A pump for use with a pneumatic tire mounted on a rim to keep said tire from becoming underinflated comprising:

a cylinder attached to said rim; a piston within said cylinder; the axis of said cylinder and said piston being disposed radially upon said rim; a first passage for unpressurized outside air to enter said pump; a second passage to allow pressurized air to enter said tire from said pump; a check valve within said second passage, said check valve including a tapered annular groove; a passage between said cylinder and the bottom of said groove, and an o-ring seating on the walls of said groove, said o-ring moving away from said groove walls to allow flow of pressurized air into said tire whenever cylinder pressure exceeds tire pressure; said pump being operated by centrifugal force which causes said piston to move radially outward and by spring means which forces said piston to move radially inward.

2. A pump for use with a pneumatic tire mounted on a rim to keep said tire from becoming underinflated comprising:

a cylinder attached to said rim; a piston within said cylinder, a passage included in said piston, the axis of said cylinder and said piston being disposed radially upon said rim; a slidable seal on said piston, said slidable seal moving between a first position and a second position relative to said piston, said moving actuated by friction of said seal against the wall of said cylinder alternatively opening and closing said passage included in said piston when said slidable seal is in said first position and said second position respectively, said passage allowing low pressure air to enter said cylinder; a first passage for unpressurized air to enter said pump; a second passage to allow pressurized air to enter said tire from said pump; said pump being operated by centrifugal force which causes said piston to move radially outward end by spring means which forces said piston to move radially inward.

3. The pump as in claim 1 or 2 in which said spring means is located external to said cylinder, inside a housing; said cylinder having a radially distant top end, said top end being approached by said piston as said piston compresses air; said piston travel within said cylinder being unrestricted for full travel to the top of said cylinder, leaving minimum volume at the end of said piston's compression stroke.

4. The pump of claim 2 in which said discharge check valve is comprised of an annular groove on the outside of said cylinder, said groove having tapered walls, an elastomeric seal ring, said seal ring seating on said walls, a passage connecting said cylinder with said groove, the result being one-way air flow from said cylinder under said seal ring deforming said seal ring.

* * * * *